US006211451B1

(12) United States Patent
Tohgi et al.

(10) Patent No.: US 6,211,451 B1
(45) Date of Patent: Apr. 3, 2001

(54) MUSIC LESSON SYSTEM WITH LOCAL TRAINING TERMINAL AND REMOTE SUPERVISORY STATION

(75) Inventors: Yutaka Tohgi; Akane Iyatomi, both of Hamamatsu; Masaki Hara; Tomoyuki Hirose, both of Tokyo, all of (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/238,645

(22) Filed: Jan. 26, 1999

(30) Foreign Application Priority Data

Jan. 29, 1998 (JP) .................................................. 10-030420

(51) Int. Cl.[7] .............................. G09B 7/00; G09B 15/02
(52) U.S. Cl. ..................... 84/470 R; 84/477 R; 434/323; 434/336; 434/365
(58) Field of Search ............................. 84/470 R, 477 R, 84/478; 434/322, 323, 335, 336, 346, 350–352, 362, 365, 379

(56) References Cited

U.S. PATENT DOCUMENTS

| | | | |
|---|---|---|---|
| 3,470,785 | * 10/1969 | Shallenberger et al. | 84/470 R |
| 3,584,530 | * 6/1971 | Andersen | 84/470 R |
| 3,695,138 | * 10/1972 | Andersen | 84/470 R |
| 4,759,717 | * 7/1988 | Larochelle et al. | 434/336 X |
| 5,270,475 | 12/1993 | Weiss et al. | |
| 5,315,911 | 5/1994 | Ochi . | |
| 5,504,269 | 4/1996 | Nagahama | 84/477 R X |
| 5,533,903 | 7/1996 | Kennedy . | |
| 5,684,952 | * 11/1997 | Stein | 434/336 X |
| 5,728,960 | * 3/1998 | Sitrick | 84/477 R |
| 5,810,605 | * 9/1998 | Siefert | 434/362 |
| 5,810,747 | * 9/1998 | Brudny et al. | 434/350 X |
| 5,820,386 | * 10/1998 | Sheppard, II | 434/322 |
| 5,823,789 | * 10/1998 | Jay et al. | 434/365 |
| 5,886,273 | 3/1999 | Haruyama . | |
| 6,077,085 | * 6/2000 | Parry et al. | 434/322 |

FOREIGN PATENT DOCUMENTS 09305171   11/1997   (EP) .

OTHER PUBLICATIONS

A. Eliens et al: "Jamming (on) the Web" Computer Networks and ISDN Systems, NL, North Holland Publishing. Amsterdam, vol. 29, No. 8–13, Sep. 1, 1997, pp. 897–903.

* cited by examiner

Primary Examiner—Stanley J. Witkowski
(74) Attorney, Agent, or Firm—Morrison & Foerster

(57) ABSTRACT

A music apparatus is communicable with a supervisory computer through a network for remotely training a user in matching with a skill level. In the music apparatus, an instrument is manually operable by the user for generating a performance. A monitor displays a lesson score in matching with the skill level so that the user is prompted to render the displayed lesson score by operating the instrument for generating a sample performance. A processor compares event data representative of the sample performance with note data representative of the lesson score to locally execute a quantitative evaluation of the sample performance. A transmitter transmits the event data representative of the sample performance to the supervisory computer through the network so that the supervisory computer can work to remotely provide a qualitative evaluation of the sample performance according to the event data to thereby arrange instruction data. The qualitative evaluation is different from the quantitative evaluation and is locally unavailable. A receiver receives the instruction data from the supervisory computer through the network to pass the instruction data to the processor. The processor operates based on either of the local quantitative evaluation and the remote qualitative evaluation represented by the received instruction data for modifying the lesson score effective to improve the skill level of the user.

13 Claims, 6 Drawing Sheets

MUSIC LESSON SYSTEM WITH LOCAL TRAINING TERMINAL AND REMOTE SUPERVISORY STATION

BACKGROUND OF THE INVENTION

The present invention generally relates to a music lesson system that supports, through a network, lessons of musical instruments having performance controls such as a keyboard, and relates to a machine readable medium storing a music training program.

Conventionally, people learn music by commuting to music schools or music lesson rooms providing music lesson facilities such as musical instruments, or by taking correspondence courses in which a student sends a recording medium such as a magnetic tape recorded with his or her musical performance and the corrected performance is fed back to the student for exercise, or by self-learning with using textbooks and with listening model performance.

In the conventional music lesson systems, no network is used for lesson or, even if a network is used, it is limited to a certain space such as lesson rooms. Another problem is that, because music performance heavily depends on human sensibilities, standalone use of a music lesson apparatus does not help students learn music.

SUMMARY OF THE INVENTION

It is therefore an object of the present invention to provide a music lesson system and a music training apparatus that brings about lessons at home or other places through a network such as the Internet, and to provide a machine readable medium storing a music training program.

It is another object of the present invention to provide a music lesson system and a music training apparatus that creates music lessons mainly dealing with human sensibilities, and to provide a machine readable medium storing a music teaching program.

In carrying out the invention and according to one aspect thereof, there is provided a music lesson system comprising a trainer terminal (teacher terminal) and at least one trainee terminal (student terminal), which is communicable with the trainer terminal through a network. The trainee terminal comprises an instrument device that is manually operable by a trainee (student) to generate a sample performance, a processor device that analyzes a training level of the trainee and formulates a curriculum corresponding to the training level, and a display device that is controlled by the processor device to display a lesson score according to the curriculum so that the lesson score can be rendered by operating the instrument device to generate the sample performance. The trainer terminal comprises a receiver device that receives data representative of the sample performance from the trainee terminal through the network, a processor device that is operated by a trainer (teacher) to evaluate the sample performance according to the received data so as to arrange advice information, which could not be arranged by the trainee terminal, and a transmitter device that transmits back the advice information to the trainee terminal. Characterizingly, the trainee terminal, upon receiving the advice information from the trainer terminal through the network, controls the display device to display an exercise part of the lesson score and a comment on the exercise part based on the advice information, thereby prompting the trainee to play the exercise part according to the comment.

In carrying out the invention and according to another aspect thereof, there is provided a music lesson apparatus or local training apparatus communicable with a training center through a network. The local training apparatus comprises an instrument device that is manually operable by a trainee to generate a sample performance, a processor device that analyzes a training level of the trainee and formulates a curriculum corresponding to the training level, a display device that is controlled by the processor device to display a lesson score according to the curriculum so that the lesson score can be rendered by operating the instrument device to generate the sample performance, a transmitter device that transmits data representative of the sample performance to the training center through the network so that the training center evaluates the sample performance according to the data to arrange advice information, which could not be arranged by the local training apparatus, and a receiver device that receives the advice information from the training center through the network. Characterizingly, the processor device operates upon receiving the advice information for controlling the display device to display an exercise part of the lesson score and a comment on the exercise part based on the advice information, thereby prompting the trainee to play the exercise part according to the comment.

Preferably, the processor device compares the data representative of the sample performance generated by the instrument device with data representative of the lesson score displayed on the display device, and operates if a difference between the sample performance and the lesson score exceeds a musically acceptable degree for arranging an exercise part of the lesson score such that the exercise part is rhythmically emphasized to facilitate practicing of the instrument device.

Preferably, the local training apparatus further comprises a sound source device that is controlled by the processor device according to the advice information for generating a model performance corresponding to the exercise part of the lesson score such that the model performance is modified according to the comment to audibly teach the trainee.

In carrying out the invention and according to still another aspect thereof, there is provided a machine readable medium for use in a music training apparatus having a CPU, a display and an instrument manually operable by a user to generate a performance and being communicable with a supervisory computer of a training center through a network for remotely training the user in matching with a skill level. The medium contains a program executable by the CPU for causing the music training apparatus to perform the method comprising the steps of displaying a lesson score on the display in matching with the skill level so that the user is prompted to render the displayed lesson score by operating the instrument for generating a sample performance, comparing event data representative of the sample performance with note data representative of the lesson score to execute a quantitative evaluation of the sample performance, transmitting the event data representative of the sample performance to the supervisory computer through the network so that the supervisory computer can work to provide a qualitative evaluation of the sample performance according to the event data to thereby arrange instruction data, the qualitative evaluation being different from the quantitative evaluation and being unavailable by the music training apparatus, receiving the instruction data from the supervisory computer through the network, and modifying the lesson score in order to improve the skill level of the user based on either of the quantitative evaluation and the qualitative evaluation represented by the received instruction data.

According to the present invention, the trainee terminal or student terminal is connected as a client computer to the trainer terminal or teacher terminal which is a server computer or supervisory computer through a wide-area network such as the Internet. The music training program is downloaded from the teacher terminal through the network and installed on the student terminal. Otherwise, the music training program is installed by setting the machine readable medium or recording medium storing such a program to the student terminal. Then, on the student terminal, music lessons such as fingering of the instrument on tempo are practiced, and the results of these lessons are sent to the teacher terminal from time to time. This allows the lesson results to be audibly evaluated at the teacher terminal with professional sensibilities. Based on the evaluation, the teacher gives advice information or instruction data associated with delicate rendition and expression to the student. The present invention therefore allows the student terminal to be set at home for example by installing the music training program on the personal computer or client computer, thereby providing sophisticated music lessons at home. In addition, physical lessons are given by the student terminal on site, while delicate lessons depending on human sensibilities are sent from the teacher terminal operating as the server, thereby efficiently providing substantial music lessons.

DETAILED DESCRIPTION OF THE INVENTION

Figure 1:
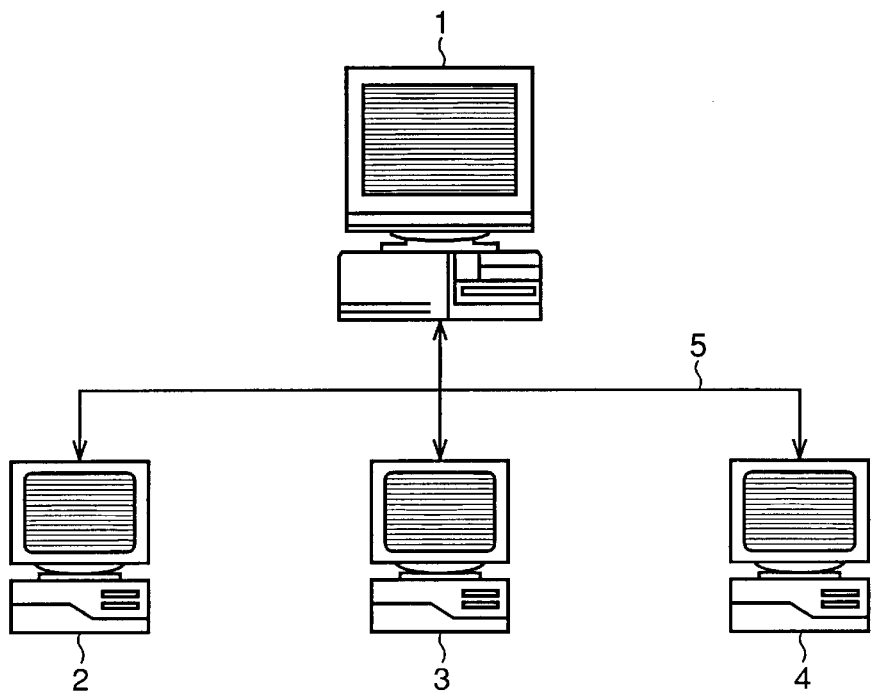
FIG. 1 is a schematic diagram illustrating a music lesson system practiced as a preferred embodiment of the invention.

An overview of a network system of a music lesson system practiced as one preferred embodiment of the invention is shown in FIG. 1. Referring to FIG. 1, reference numeral 1 denotes a teacher terminal or trainer terminal operating as a server computer or supervisory computer in a training center. Reference numerals 2, 3, and 4 denote student terminals or trainee terminal operating as client computers or local music training apparatuses. The teacher terminal 1 and the student terminals 2, 3, and 4 are interconnected through a network 5. The network 5 is a wide-area network such as the Internet. In this example, the three student terminals 2, 3, and 4 are provided. It is obvious that more than three student terminals can be provided for this system. The student terminals 2, 3, and 4 are each installed with a music training program. The student terminals 2, 3, and 4 are each provided with performance controls or instrument devices such as a keyboard, not shown.

In the overall construction of FIG. 1, the inventive music lesson system includes a trainer terminal (teacher terminal 1) and at least one trainee terminal (student terminal 2), which is communicable with the trainer terminal through the network 5. In each trainee terminal, an instrument device such as the keyboard is manually operable by a trainee (student) to generate a sample performance. A processor device of the client computer analyzes a training level of the trainee and formulates a curriculum corresponding to the training level. A display device of the client computer is controlled by the processor device to display a lesson score according to the curriculum so that the lesson score can be rendered by operating the instrument device to generate the sample performance. On the other hand, the trainer terminal is equipped with a receiver device that receives data representative of the sample performance from the trainee terminal through the network 5. A processor device of the server computer is operated by a trainer (teacher) to evaluate the sample performance according to the received data so as to arrange advice information, which could not be arranged by the trainee terminal. A transmitter device transmits back the advice information to the trainee terminal. Characterizingly, the trainee terminal, upon receiving the advice information from the trainer terminal through the network 5, controls the display device to display an exercise part of the lesson score and a comment on the exercise part based on the advice information, thereby prompting the trainee to play the exercise part according to the comment.

Figure 3:
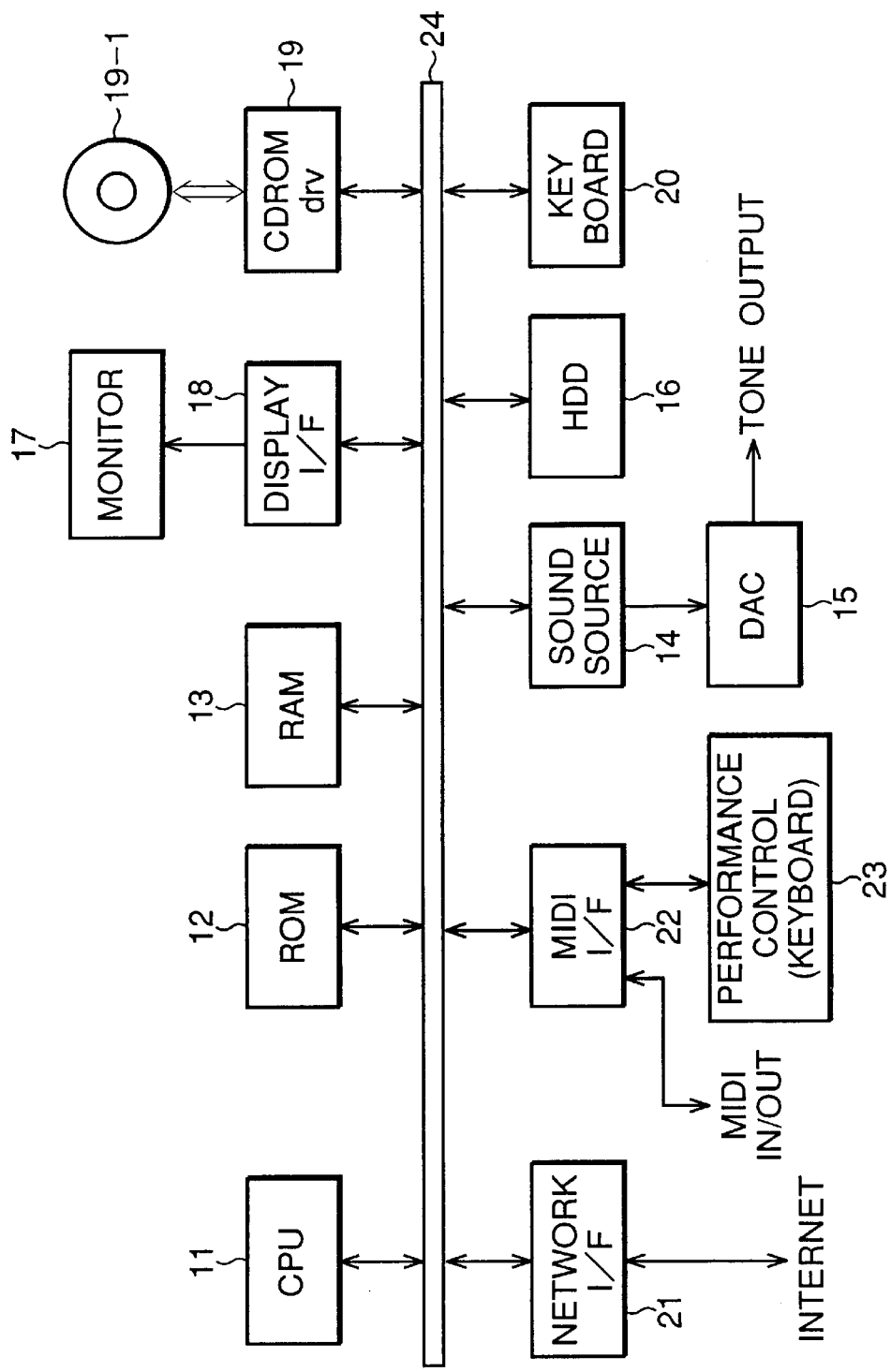
FIG. 3 is a block diagram illustrating a hardware constitution of the student terminal of the music lesson system according to the invention.

FIG. 3 shows a block diagram illustrating an example of the constitution of each of the student terminals 2, 3, and 4. Referring to FIG. 3, a CPU (Central Processing Unit) 11 is used for the main controller or processor device. Under the control of the CPU 11, the music training program is executed. Concurrently, the processing of another application program may be executed. The CPU 11 is connected, through a CPU bus 24, to a ROM (Read Only Memory) 12, a RAM (Random Access Memory) 13, a display interface (DISPLAY I/F) 18, an HDD (Hard Disk Drive) 16, a CDROM drive (CD-ROM drv) 19, and a keyboard (KEY BOARD) 20 having kana keys, numeric keys, and symbol keys.

The CPU 11 is also connected, through the CPU bus 24, to a sound source 14 composed of hardware or software, a network interface (NETWORK I/F) 21 including a receiver and a transmitter to provide a communication interface with a network such as the Internet, and a MIDI interface (MIDI I/F) 22 for transferring MIDI messages. The sound source 14 is connected to a DAC 15 that converts digital tone data received from the sound source 14 into an analog tone signal at each sampling period and that outputs the analog tone signal. The MIDI I/F 22 is connected to a performance control 23 or a music instrument such as a keyboard, or connected to an external MIDI device.

The ROM 12 stores programs to be executed by the CPU 11. In the RAM 13, a curriculum file, a personal information file, an advice file, to be described later, and music data and score data for use in music lessons are loaded. In addition, the work memory area for use by the CPU 11 and other areas are set in the RAM 13.

A display monitor 17 and the display interface 18 are a display device through which a user (namely a student or trainee) interacts with the student terminal. The HDD 16 stores an operating system OS (for example, Windows 95 (trademark) of Microsoft Corporation), a music training program, music score data, music lesson files, and other application programs. A CD-ROM 19-1 is loaded in the CD-ROM drive 19. From the CD-ROM 19-1, application programs and various data are retrieved. These application programs and data are installed or copied on the HDD 16. In this case, the music training program is stored in the CD-ROM 19-1, hence the program can be installed and upgraded with ease.

The sound source 14 can be implemented by hardware such as a sound source board or software as a kind of application program. The sound source 14 may be an FM synthesis sound source, a PCM sound source in which tone sample data is read from a waveform memory, or a VA sound source simulating acoustic musical instruments. The network interface 21 provides a bi-directional receiver/transmitter interface between the student terminal and a network such as the Internet through a telephone line for example. Through the network interface, the student terminal can receive application software such as music training programs and various data. The MIDI interface 22 transfers MIDI messages between an external MIDI device, and receives MIDI event data from the performance control 23 such as a MIDI keyboard.

Digital tone data passed from the sound source 14 to the DAC 15 at every period of a predetermined sampling frequency FS (for example, 44.1 kHz) is converted into an analog tone signal, which is outputted as denoted TONE OUTPUT. This tone signal is inputted in a sound system, not shown, for sounding.

The above-mentioned constitution is equivalent to that of a personal computer or a workstation. Therefore, the student terminal of the music lesson system according to the invention may be implemented on a personal computer or a workstation. As illustrated in the drawings, the music lesson apparatus or local training apparatus implemented by the personal computer or work station is communicable with a remote training center through the network interface 21. The local training apparatus is equipped with an instrument device or the performance control 23 that is manually operable by a trainee to generate a sample performance. The CPU 11 or the processor device analyzes a training level of the trainee and formulates a curriculum corresponding to the training level. The display device including the monitor 17 is controlled by the processor device to display a lesson score according to the curriculum so that the lesson score can be rendered by operating the instrument device to generate the sample performance. A transmitter device of the network interface 21 transmits data representative of the sample performance to the training center through the network so that the training center evaluates the sample performance according to the data to arrange advice information, which could not be arranged by the local training apparatus. A receiver device of the network interface 21 receives the advice information from the training center through the network. Characterizingly, the processor device operates upon receiving the advice information for controlling the display device to display an exercise part of the lesson score and a comment on the exercise part based on the advice information, thereby prompting the trainee to play the exercise part according to the comment.

Preferably, the processor device compares the data representative of the sample performance generated by the instrument device with data representative of the lesson score displayed on the display device, and operates if a difference between the sample performance and the lesson score exceeds a musically acceptable degree for arranging an exercise part of the lesson score such that the exercise part is rhythmically emphasized to facilitate practicing of the instrument device.

Preferably, the local training apparatus is equipped with the sound source device 14 that is controlled by the processor device according to the advice information for generating a model performance corresponding to the exercise part of the lesson score such that the model performance is modified according to the comment to audibly teach the trainee.

It should be noted that constitution of the training center or teacher terminal is also equivalent to a personal computer or a workstation and substantially the same as that of the student terminal. Therefore, the detailed construction of the teacher terminal will be readily understood from FIG. 3. The teacher terminal or central training apparatus is communicable through a network with the local training apparatus having an instrument device manually operable by a trainee to generate a sample performance, a processor device for analyzing a training level of the trainee and formulating a curriculum corresponding to the training level, and a display device controlled by the processor device to display a lesson score according to the curriculum so that the lesson score can be rendered by operating the instrument device to generate the sample performance. The central training apparatus is equipped with a receiver device that receives data representative of the sample performance from the local training apparatus through the network. A processor device or CPU is operated by a trainer to evaluate the sample performance according to the received data so as to arrange advice information, which could not be arranged by the local training apparatus. A transmitter device transmits back the advice information to the local training apparatus, thereby enabling the local training apparatus to display an exercise part of the lesson score and a comment on the exercise part for prompting the trainee to play the exercise part according to the comment.

Figure 2:
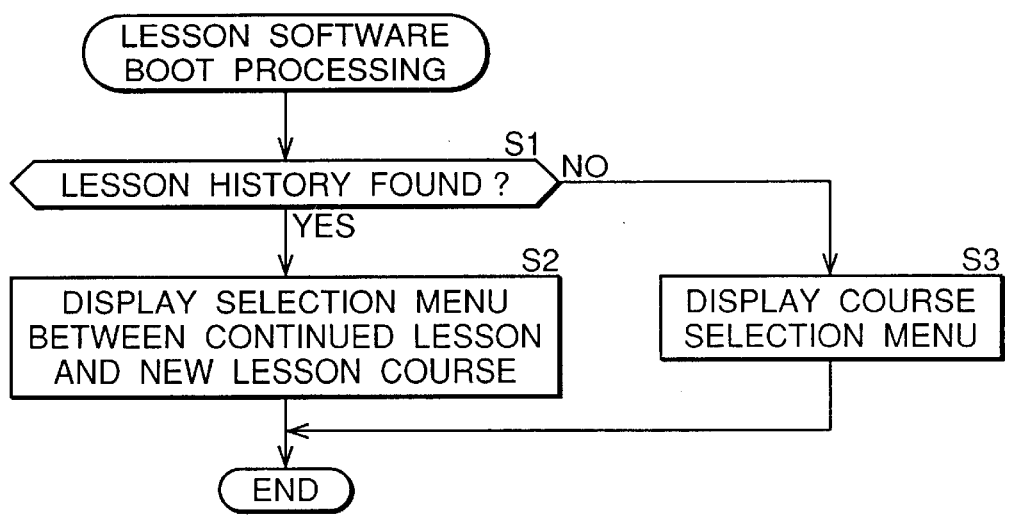
FIG. 2 is a flowchart indicative of booting a lesson software installed on a student terminal of the music lesson system according to the invention.
Figure 7:
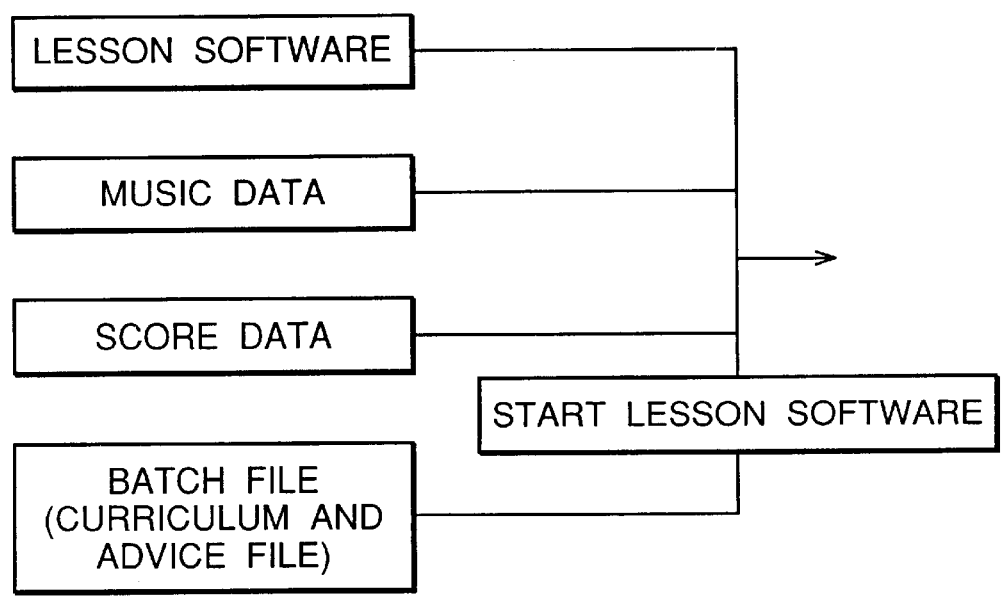
FIG. 7 is a diagram illustrating a software constitution of a music training program executed in the music lesson system according to the invention.

The music training program installed on the student terminal has a constitution shown in FIG. 7. To be specific, this program includes lesson software, music data for lesson, score data corresponding to the music data, and a batch file including curriculum data and advice data to be described later. Executing the batch file starts the lesson software. The following describes lesson software boot processing with reference to the flowchart shown in FIG. 2. It should be noted that the following description will be made with the user as a student.

When the batch file in the music training program is executed on the student terminal, the lesson software starts. In step S1, the CPU 11 searches the storage devices in the student terminal for a lesson history. If a curriculum file or a personal information file is found on the HDD 16, it is regarded that there is a lesson history of the user, upon which the processing goes to step S2. In step S2, a course selection menu between a continued lesson and a new lesson is displayed on the monitor of the student terminal by opening a window for example, upon which the lesson software boot processing comes to an end. If no lesson history is found, the processing branches to step S3, in which a course selection menu is displayed on the monitor of the student terminal by opening a window for example, upon which the lesson software boot processing comes to an end.

The lesson software provides several courses that the student selects according to his or her music skill level. In this case, different music pieces to be learned or different music arrangements are selected according to the lesson course levels. For example, for the beginner course, music pieces that can be performed with relatively simple rendition are set by the lesson software. Alternatively, music pieces for the advanced course are modified with arrangements from the beginner course.

Figure 4:
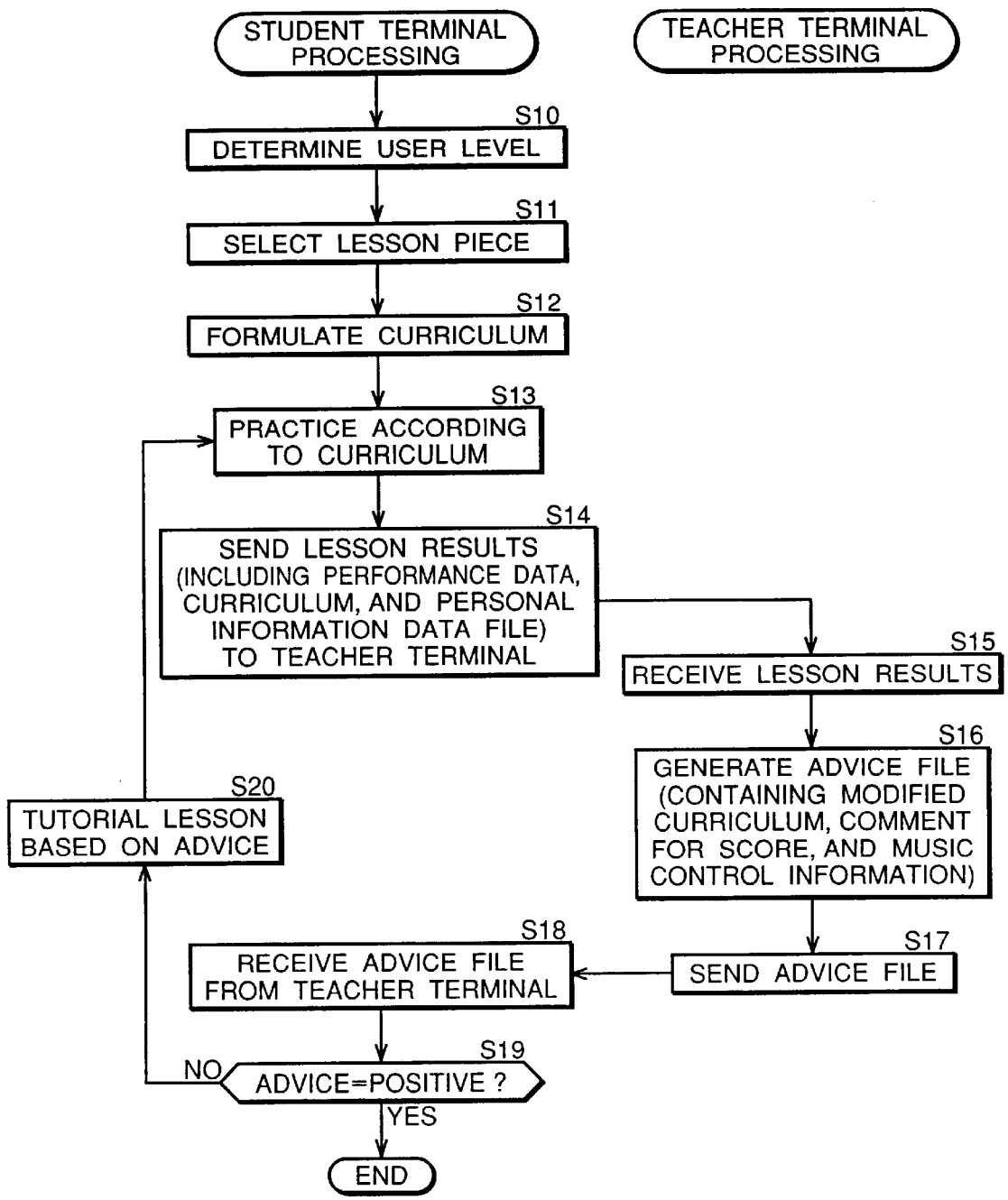
FIG. 4 is a flowchart indicative of a student terminal processing routine and a teacher terminal processing routine of the music lesson system according to the invention.

Then, when the student selects the continued lesson or makes new course selection while looking at the display screen on the display monitor 17 after starting of the lesson software, a student terminal processing routine starts. The following describes the student terminal processing routine and a teacher terminal processing routine with reference to the flowchart shown in FIG. 4.

When the student terminal processing routine starts, user level determination processing is executed in step S10. If the continued lesson has been selected, the current course of the last lesson is selected. If the student has made the course selection, the student selects one of the advanced course, intermediate course and beginner course, or requests the teacher terminal to select an appropriate course. In the latter case, the teacher terminal selects a test piece for evaluation from the music data file, and instructs the user to play a predetermined bar of the test piece or the whole test piece by means of the instrument device at hand. When the user plays the test piece by use of the keyboard, which is the performance control 23 or the instrument device, the performance information or event data outputted from the keyboard is compared with the music data of the test piece to determine differences therebetween with respect to key touch timing, gate time (key release timing), pitch (note), and key pressing force (velocity). Depending on the degree of the differences, the appropriate course is selected from the advanced course, intermediate course, and beginner course.

Figure 5C:
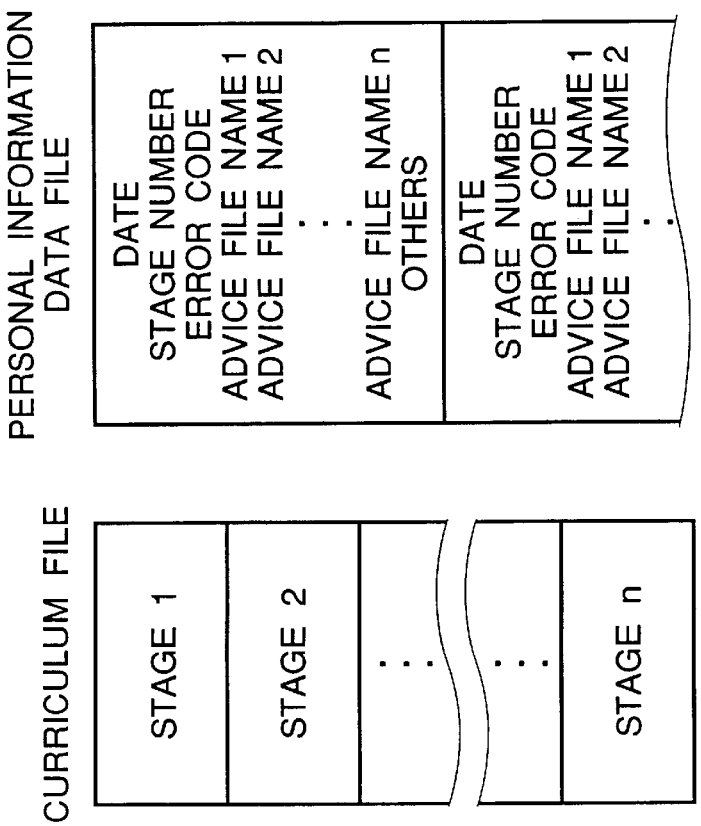
FIGS. 5(a), 5(b) and 5(c) show diagrams illustrating a curriculum file, a personal information data file, and an advice file created in the music lesson system according to the invention.
Figure 5B:
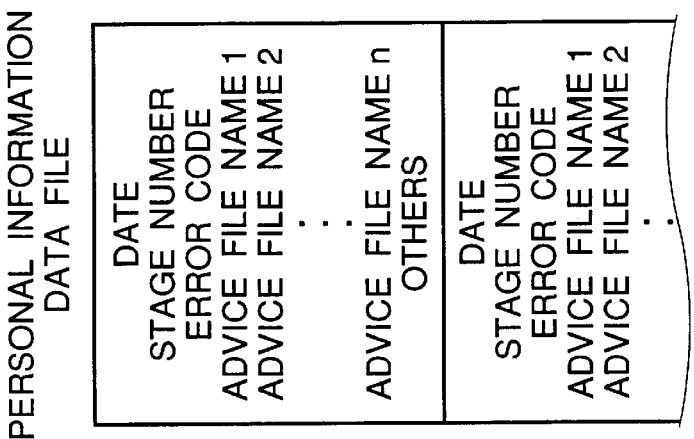
Figure 5A:
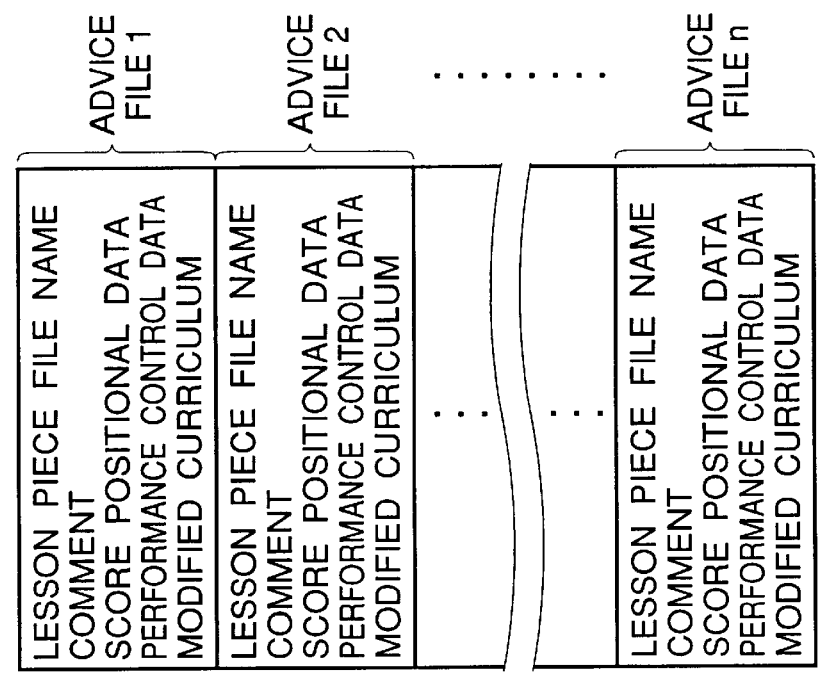

Next, in step S11, if the continued lesson has been selected, a list of music files practiced so far is displayed, from which the user or student selects a desired one. If the student has selected one of advanced, intermediate, and beginner courses or the teacher has selected one of advanced, intermediate, and beginner courses, a list of music titles contained in the music data file corresponding to the selected course is displayed on the display monitor 17, from which the student selects desired one. Then, in step S12, a curriculum file is generated based on the selected course and the selected music. The configuration of this curriculum file is shown in FIG. 5(a). The curriculum is composed of plural stages 1, 2, . . . , n. The number of stages depends on the selected course and the selected lesson music. For example, there are a first stage of lesson by the right hand, a second stage of lesson by the left hand, and a third stage of lesson by both hands. Sometimes, a lesson music part obtained by dividing a lesson music into a predetermined number of measures is assigned to each stage. In this curriculum file, when the curriculum assigned to a particular stage is completed, the student can proceed to a next stage and the pointer indicative of the progress is advanced.

Next, in step S13, if the continued lesson has been selected, the lesson is resumed at the stage indicated by the above-mentioned pointer in the curriculum file. If a course has been newly selected or a course has been selected by the skill level determination of the student, the lesson starts at stage 1. The following describes this lesson by use of the beginner course for a particular example. In the beginner course, a music piece to be practiced is divided into predetermined number of short bars. The practice is made in three steps of right-hand lesson, left-hand lesson, and both-hand lesson in exercise parts consisting of the predetermined number of short bars. In this case, the score of the exercise part having a unit interval to be practiced in the lesson piece is read from the score data file and displayed on the display monitor 17. At this moment, in the right-hand lesson, the notes to be played by the right hand are shown in dark shade and those to be played by the left hand are shown in light shade for example. In the left-hand lesson, the notes to be played by the left hand are shown in dark shade and those to be played by the right hand are shown in light shade over the displayed lesson score, for example. In the both-hand lesson, the notes to be played by the right hand and the left hand are shown in dark shade. It should be noted that the duration of the unit interval depends on a selected course and the progress of learning or training.

In addition, in the lesson score displayed on the display monitor 17, a marker sequentially indicates the notes to be played, thereby prompting the student to play each bar by keeping time. The student follows this marker to render the lesson score by the keyboard so that he or she can play strictly as instructed by the score while keeping time in a predetermined manner. Further, this lesson is practiced in two modes. In one mode, the student plays without accompaniment. In the other mode, the student plays the keyboard with the accompaniment. The student can select one of the two modes.

During practice, a typical model performance of the lesson score is compared with the sample performance inputted by the student. The degree of differences in key touch timing, gate time (key release timing), pitch (note), and key pressing force (velocity or volume) between note data of the model performance and event data of the sample performance is determined for local quantitative evaluation. If the student has made mistakes in the sample performance beyond an acceptable degree, the performance is stopped and the notes at which the student has made mistakes are shown in red, thereby prompting the student to practice the error portion in a tutorial manner.

In determining whether the degree of the performance error is beyond the acceptable level or not, predetermined values of tempo, pitch and volume providing criteria may be set as parameters subject to student learning levels. This arrangement makes it practicable to make a reasonable judgment for low-level students such as beginners and a strict judgment for high-level students.

Figure 6:
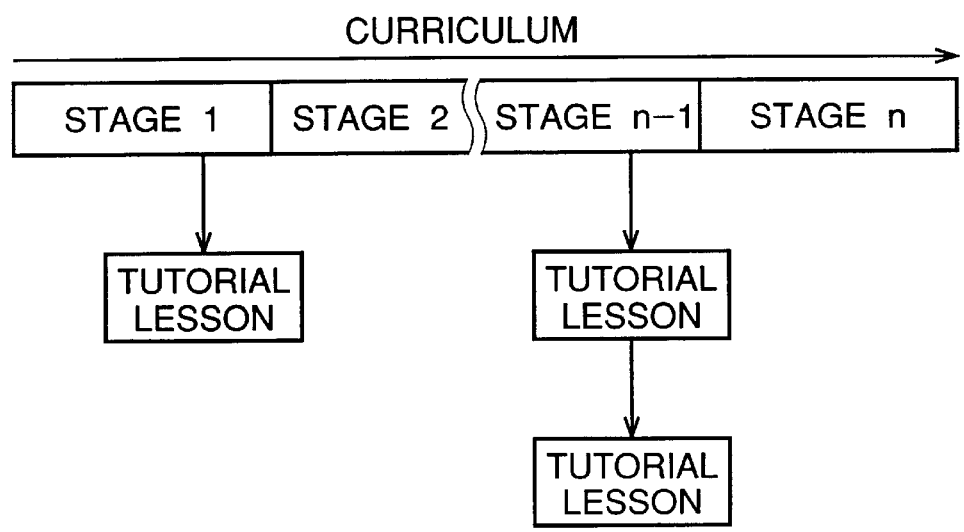
FIG. 6 is a diagram illustrating a curriculum used in the music lesson system according to the invention.

The following describes a manner of the above-mentioned tutorial lesson with reference to FIG. 6. The curriculum is shown in FIG. 6 along a time axis or lateral axis. With time, the lesson stage goes up or advances. In this example, a tutorial lesson is instructed in stage 1 and another tutorial lesson is instructed in stage n−1. Each tutorial lesson is repeated until a problem part can be played almost perfectly. It should be noted that the tutorial lesson is instructed not only by the local student terminal but also, in some cases, by the remote teacher terminal as will be described later. When a tutorial lesson has been practiced by the student, a scheduler program saves the problem part and the result of the tutorial lesson into the personal information file. The tutorial lesson is practiced by fingering the keyboard at a note where the student has made a mistake and at notes before and after that note and by playing a lesson pattern formed by combining variation patterns stored in the storage devices such as the ROM 12 and the RAM 13.

Figure 8:
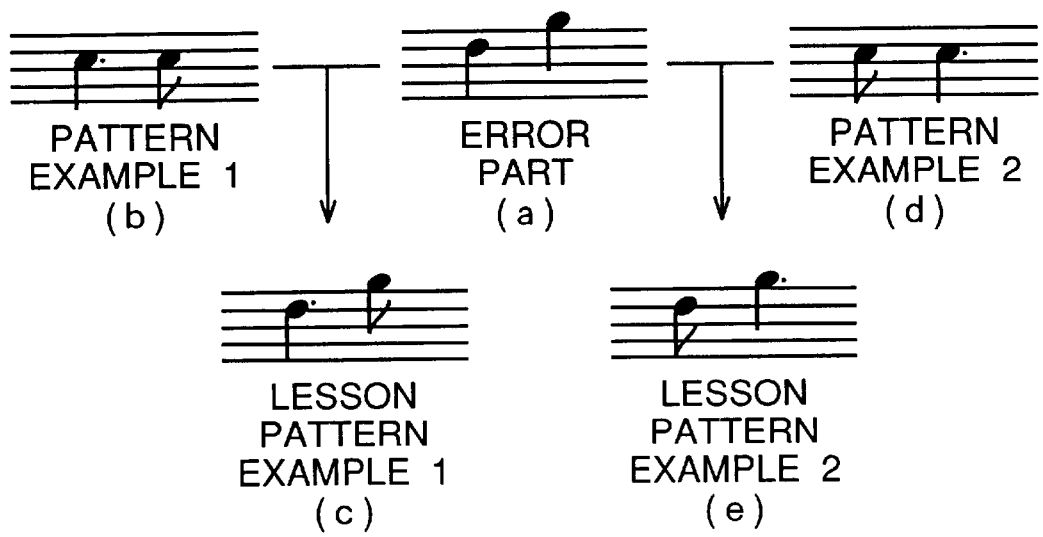
FIG. 8 is a diagram for describing a lesson pattern creating algorithm in the music lesson system according to the invention.

The following describes an example of a manner in which this lesson pattern is formed with reference to FIG. 8. It should be noted that the RAM 13 stores copies of variation patterns stored in the HDD 16. If a position at which the student has made mistakes are two quarter notes "re" and "sol," a variation pattern having a length equivalent to two quarter notes is selected. For example, pattern example 1 shown in FIG. 8(*b*) is selected. It should be noted that every variation pattern has no pitch and is therefore a plain rhythm pattern. As shown, pattern example 1 is composed of a dotted quarter and an eighth note. Combining this pattern example 1 with the mistaken part shown in FIG. 8(*a*) forms a lesson pattern example 1 shown in FIG. 8(*c*). The lesson pattern example 1 thus formed is composed of a dotted quarter "re" and an eighth note "sol." Because the rhythm is added, this lesson pattern is easy to play, thereby enhancing lesson efficiency.

If a pattern example 2 composed of an eighth note and a dotted quarter shown in FIG. 8(*d*) is selected, combining the pattern example 2 with the mistaken part shown in FIG. 8(*a*) forms a lesson pattern example 2 shown in FIG. 8(*e*). The lesson pattern example 2 thus formed is composed of an eighth note "re" and a dotted quarter "sol." In this case too, a rhythm is added, so that this lesson pattern is easy to play. The lesson pattern or exercise part is rhythmically emphasized to facilitate practicing of the instrument device. The performance information generated by this tutorial lesson is compared with the formed lesson patterns. According to the result of the comparison, the lesson is practiced until the lesson score is played without making mistakes more than a predetermined number of times.

It should be noted that, when the student has practiced the performance at the student terminal, the scheduler program controlling the curriculum forms a personal information data file of that student. This personal information data file contains history date indicative of a data on which the lesson was made, stage number information indicative of a stage in which the lesson was made, an error code indicative of the error made in the lesson, a file name indicative of the advice data file received from the teacher terminal to be described later, and other information as shown in FIG. 5(*b*). Therefore, the personal information data file indicates what lessons the student has practiced.

Referring the flowchart shown in FIG. 4 again, the student practices until he or she can play a whole piece by the right hand in the beginner course, then another whole piece by the left hand, and lastly still another whole piece by both hands. During these lessons, the student can send the lesson results to the teacher terminal from time to time in step S14. To be more specific, the event data representative of the sample performance, the curriculum file including the stage pointer information indicative of which stage in the curriculum the student has achieved, and the personal information data file indicative of the lesson items to date generated by the scheduler program are sent to the teacher terminal.

The teacher terminal is kept in a normally active state. In step S15, the teacher terminal receives the lesson results from the student terminal. The received lesson results are stored on recording media such as HDD arranged on the teacher terminal. When the teacher terminal receives the lesson results, notification of the arrival of the new data is given to a teacher or trainer. In step S16, the teacher opens files of the stored lesson results, reproduces the event data of the sample performance received from the student terminal, executes a qualitative evaluation of the sample performance, and creates a tutorial advice file containing instruction data by referencing the personal information data and the curriculum received with the performance event data. This advice file mainly includes a file name of lesson music pieces stored in the student terminal, positional data indicative of positions on the score of the lesson music piece on which the teacher wants to make comments, comment data to be displayed over the score at the position indicated by the positional data, performance control information used for reproducing the lesson music piece, and, if a curriculum change is required, changed curriculum data. The performance control information for the lesson music piece includes interval positional information for specifying a unit interval in the lesson music piece on which the teacher wants to make comments, repeat reproduction information for repeatedly reproducing desired unit intervals, and part on/off information for controlling the sounding of each part. The comment is displayed concurrently with the lesson score when the specified unit interval or specified part of the score appears on the display monitor 17, the comments for the student being displayed in text or graphics.

The advice file thus created is sent back to the student terminal in step S17. Because no score data and music data are contained in the advice file, the transfer load is reduced. In step S18, the student terminal receives the advice file from the teacher terminal. When the advice file has been received, the student terminal notifies the student of the reception. Because the advice file is equivalent to a batch file, when the student opens the received advice file, the lesson software is started if it is not in the active state. Then, the student terminal determines in step S19 whether the advice or instruction is positive or negative. If the advice is found positive or affirmative, the lesson of the current music piece comes to an end. If the advice is found negative, then the processing branches to step S20, in which the student is instructed to practice the tutorial lesson based on the advice file prepared by the teacher. This is illustrated in FIG. 6 as the tutorial lesson.

Figure 9:
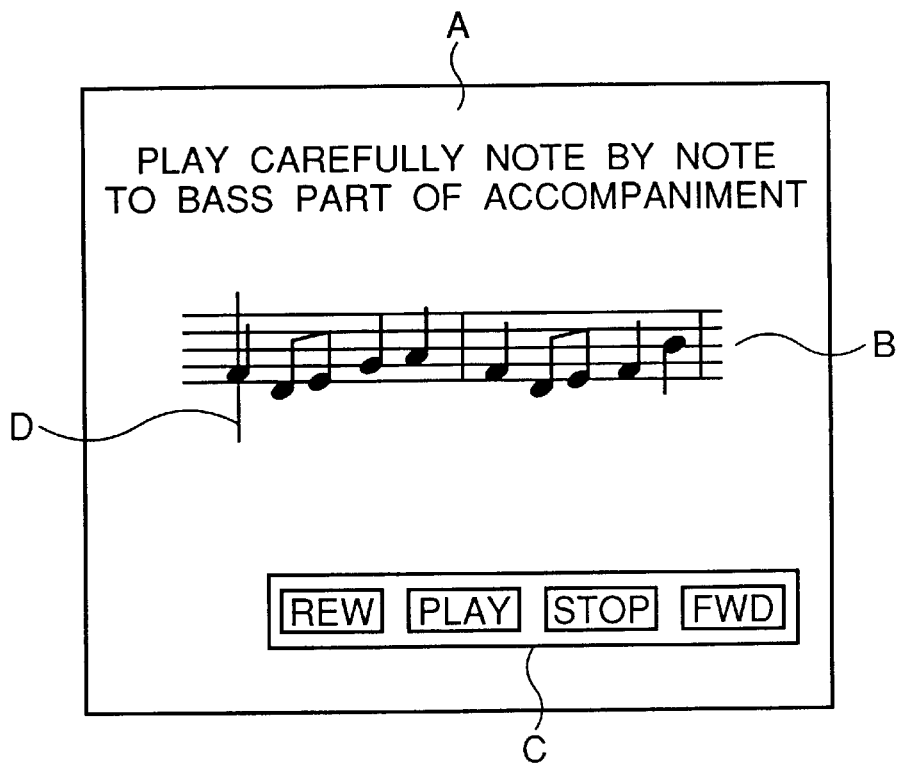
FIG. 9 is a diagram illustrating an example of a lesson screen displayed on a monitor of the student terminal in the music lesson system according to the invention.

The following further describes the tutorial lesson to be practiced in step S20. When the student opens the received advice file, a list of exercise positions or parts indicated by the teacher is displayed on the display monitor 17. When the student selects one of the positions, the score corresponding to the selected position is read from the score data file according to the positional data in the advice file, and is displayed on the display monitor 17. At the same time, the comments of the teacher are displayed over the score. This is illustrated in FIG. 9, in which the lesson screen displays comment A "Play this part carefully, note by note, along a bass part of accompaniment" above a score B containing the problem or exercise parts. It should be noted that a control switch C is displayed for making model performance in the displayed score.

When "PLAY" button of the control switch C is selected by clicking a pointing device such as a mouse, a marker D displayed on the lesson score starts moving in synchronization with tempo, the tones of the notes indicated by the marker D being reproduced by the sound source 14 and the DAC 15. These tones are reproduced as model performance instructed by the teacher based on the control information included in the advice file.

The student can also play a practice performance to the reproduced model performance. In this lesson, the student can lower the volume of or turn off other parts than a bass part so that the bass part of accompaniment is heard well as recommended by the comment A, when the reproduction is made by clicking the "PLAY" button. Control information for controlling the sounding of all the parts is also contained in the advice file. It should be noted that, when the lesson practiced following the teacher advice is detected on the student terminal, the advice file name of the advice file is added to the personal information data file in part of the lesson history as illustrated in FIG. 5(*b*).

Referring to the flowchart shown in FIG. 4 again, when the tutorial lesson has been practiced in step S20, the processing goes back to step S13, in which the lesson according to the curriculum is further practiced so that the current lesson stage is cleared. If the advice file contains curriculum data modified for enhancing the lesson achievement, the lesson is practiced according to the modified curriculum. When the current stage has been cleared, the lesson of the next stage is taken up. Then, the results of the lesson are sent to the teacher terminal for the qualitative evaluation of the music lesson in the manner described above. When the advice of approval come from the teacher terminal, the lesson of the test piece comes to an end. Namely, the operations of step S13 through step S20 are repeated until the advice of approval come from the teacher terminal, thus clearing every lesson stage. It should be noted that, when the advice of approval comes from the teacher terminal, final stage n has been completed. In this situation, the lesson results to be reported to the teacher terminal contains the whole performance data of one music piece. Therefore, the student can end the music lesson of all the stages and proceed to a next higher course.

Referring back to FIG. 3, the inventive music apparatus of the student terminal is communicable with a supervisory computer of the teacher terminal through a network for remotely training a user in matching with a skill level. In the music apparatus, instrument means in the form of the performance control 23 is manually operable by the user for generating a performance. Display means is provided in the form of the monitor 17 for displaying a lesson score in matching with the skill level so that the user is prompted to render the displayed lesson score by operating the instrument means for generating a sample performance. Processor means is provided in the form of CPU 11 for comparing event data representative of the sample performance with note data representative of the lesson score to locally execute a quantitative evaluation of the sample performance. Transmitter means is provided in the network interface 21 for transmitting the event data representative of the sample performance to the supervisory computer through the network so that the supervisory computer can work to remotely provide a qualitative evaluation of the sample performance according to the event data to thereby arrange instruction data. The qualitative evaluation is different from the quantitative evaluation and is locally unavailable. Receiver means is also provided in the network interface 21 for receiving the instruction data from the supervisory computer through the network to pass the instruction data to the processor means. The processor means or the CPU 11 operates based on either of the local quantitative evaluation and the remote qualitative evaluation represented by the received instruction data for modifying the lesson score effective to improve the skill level of the user.

Specifically, the CPU 11 is operative based on the instruction data for controlling the display monitor 17 to display an exercise part of the lesson score and a comment on the exercise part, thereby prompting the user to play the exercise part according to the comment. The inventive music apparatus is equipped with the sound source 14 controlled by the CPU 11 according to the instruction data for generating a model performance corresponding to the exercise part of the lesson score such that the model performance is modified according to the comment to audibly teach the user.

Expediently, the CPU 11 is operative when the quantitative evaluation indicates that a difference between the sample performance and the lesson score exceeds a musically acceptable degree for arranging an exercise part of the lesson score such that the exercise part is rhythmically emphasized to facilitate operation of the instrument means. Further, the CPU 11 executes the quantitative evaluation in terms of at least one of a rhythm, a pitch and a volume of the sample performance while the qualitative evaluation is executed in terms of a total rendition of the sample performance. Moreover, the CPU 11 analyzes an initial performance generated by the user to determine the skill level of the user, and formulates the lesson score in matching with the skill level.

As described before, the student terminal and the teacher terminal in the music lesson system according to the invention can be constituted by a personal computer or a workstation. The music training program can be stored on a magnetic disk such as a floppy disk, an optical disc, a semiconductor memory, or other machine readable media for supply to the computer. Alternatively, the music training program may be downloaded from the network interface 21 through a communication line such as a network as described before. Supplying the programs through the machine readable media or the network facilitates the addition and upgrading of the programs. Further, the present invention is applicable to a system for which a sound source, a recording device, and so on are provided separately or a system in which these devices are interconnected with each other.

The music training program according to the invention may be stored in the hard disk drive 16, from which the program is loaded into the RAM 13 for execution of music lesson processing. This facilitates addition and upgrading of the program. Instead of the HDD 16, the CD-ROM drive 19 on which the CD-ROM 19-1 is set may be used. Alternatively, a magneto-optical (MO) disk drive having capabilities equivalent to those of the CDROM drive 19 may be arranged. The machine readable medium such as the CD-ROM 19-1 is used in the inventive music apparatus having the CPU 11, the display 17 and the instrument 23 manually operable by the user to generate a performance and being communicable with a supervisory computer through a network for remotely training the user in matching with a skill level. The medium contains the music training program executable by the CPU 11 for causing the music apparatus to perform the method comprising the steps of displaying a lesson score on the display 17 in matching with the skill level so that the user is prompted to render the displayed lesson score by operating the instrument 23 for generating a sample performance, comparing event data representative of the sample performance with note data representative of the lesson score to execute a quantitative evaluation of the sample performance, transmitting the event data representative of the sample performance to the supervisory computer through the network so that the supervisory computer can work to provide a qualitative evaluation of the sample performance according to the event data to thereby arrange instruction data, receiving the instruction data from the supervisory computer through the network, and modifying the lesson score in order to improve the skill level of the user based on either of the quantitative evaluation and the qualitative evaluation represented by the received instruction data.

As mentioned above and according to the invention, the student terminal is connected as a client and the teacher terminal is connected as a server to a wide-area network such as the Internet. Music training program can be installed on the student terminal from the teacher terminal through the network or installed by means of the machine readable medium storing the program that is set to the student terminal. At the student terminal, the student practices music lessons such as fingering and tempo keeping, results of which being transferred to the teacher terminal from time to time. This allows the teacher terminal to audibly evaluate the lesson results with professional music sensibilities, and to send back an advice to the student terminal, the qualitative evaluation with musical sensibilities being difficult to be taught by the training program installed at the student terminal. Consequently, the student terminal can be placed at home by installing the music training program on a personal computer. This allows students to receive qualitative music lessons at home. Further, quantitative lessons are given by the student terminal, while qualitative lessons depending on human sensibilities are given from the teacher terminal operating as a server, thereby efficiently providing substantial music lessons.

What is claimed is:

1. A music lesson system comprising a trainer terminal and at least one trainee terminal, which is communicable with the trainer terminal through a network, the trainee terminal comprising an instrument device that is manually operable by a trainee to generate a sample performance, a processor device that provisionally prepares a test piece in the at least one trainee's terminal, compares the test piece with the sample performance to determine differences therebetween to detect a training level of the trainee, and formulates a curriculum corresponding to the training level, and a display device that is controlled by the processor device to display a lesson score according to the curriculum so that the lesson score can be rendered by operating the instrument device to generate the sample performance, the trainer terminal comprising a receiver device that receives data representative of the sample performance from the trainee terminal through the network, a processor device that is operated by a trainer to evaluate the sample performance according to the received data so as to arrange advice information, which could not be arranged by the trainee terminal, and a transmitter device that transmits back the advice information to the trainee terminal, wherein the trainee terminal, upon receiving the advice information from the trainer terminal through the network, controls the display device to display an exercise part of the lesson score and a comment on the exercise part based on the advice information, thereby prompting the trainee to play the exercise part according to the comment.

2. A local training apparatus communicable with a training center through a network, comprising:

an instrument device that is manually operable by a trainee to generate a sample performance;

a processor device that provisionally prepares a test piece in a trainee's terminal, compares the test piece with the sample performance to determine differences therebetween to detect a training level of the trainee, and formulates a curriculum corresponding to the training level;

a display device that is controlled by the processor device to display a lesson score according to the curriculum so that the lesson score can be rendered by operating the instrument device to generate the sample performance;

a transmitter device that transmits data representative of the sample performance to the training center through the network so that the training center evaluates the sample performance according to the data to arrange advice information, which could not be arranged by the local training apparatus; and a receiver device that receives the advice information from the training center through the network;

wherein the processor device operates upon receiving the advice information for controlling the display device to display an exercise part of the lesson score and a comment on the exercise part based on the advice information, thereby prompting the trainee to play the exercise part according to the comment.

3. The local training apparatus as claimed in claim 2, wherein the processor device compares the data representative of the sample performance generated by the instrument device with data representative of the lesson score displayed on the display device, and operates if a difference between the sample performance and the lesson score exceeds a musically acceptable degree for arranging an exercise part of the lesson score such that the exercise part is rhythmically emphasized to facilitate practicing of the instrument device.

4. The local training apparatus as claimed in claim 2, further comprising a sound source device that is controlled by the processor device according to the advice information for generating a model performance corresponding to the exercise part of the lesson score such that the model performance is modified according to the comment to audibly teach the trainee.

5. A central training apparatus communicable through a network with a local training apparatus having an instrument device manually operable by a trainee to generate a sample performance, a processor device for provisionally preparing a test piece in a trainee's terminal, comparing the test piece with the sample performance to determine differences therebetween to detect a training level of the trainee, and formulating a curriculum corresponding to the training level, and a display device controlled by the processor device to display a lesson score according to the curriculum so that the lesson score can be rendered by operating the instrument device to generate the sample performance, the central training apparatus comprising:

a receiver device that receives data representative of the sample performance from the local training apparatus through the network;

a processor device that is operated by a trainer to evaluate the sample performance according to the received data so as to arrange advice information, which could not be arranged by the local training apparatus; and a transmitter device that transmits back the advice information to the local training apparatus, thereby enabling the local training apparatus to display an exercise part of the lesson score and a comment on the exercise part for prompting the trainee to play the exercise part according to the comment.

6. A music apparatus communicable with a supervisory computer through a network for remotely training a user in matching with a skill level, comprising:

instrument means manually operable by the user for generating a performance;

processor means for provisionally preparing a test piece in a user's terminal, comparing the test piece with the performance generated by the instrument means to determine differences therebetween to detect a training level of the user and formulating a curriculum corresponding to the training level of the user;

display means for displaying a lesson score in matching with the skill level of the user according to the curriculum so that the user is prompted to render the displayed lesson score by operating the instrument means for generating a sample performance;

wherein said processor means compares event data representative of the sample performance with note data representative of the lesson score to locally execute a quantitative evaluation of the sample performance;

transmitter means for transmitting the event data representative of the sample performance to the supervisory computer through the network so that the supervisory computer can work to remotely provide a qualitative evaluation of the sample performance according to the event data to thereby arrange instruction data, the qualitative evaluation being different from the quantitative evaluation and being locally unavailable; and receiver means for receiving the instruction data from the supervisory computer through the network to pass the instruction data to the processor means;

wherein the processor means operates based on either of the local quantitative evaluation and the remote qualitative evaluation represented by the received instruction data for modifying the lesson score effective to improve the skill level of the user.

7. The music apparatus as claimed in claim 6, wherein the processor means includes means operative based on the instruction data for controlling the display means to display an exercise part of the lesson score and a comment on the exercise part, thereby prompting the user to play the exercise part according to the comment.

8. The music apparatus as claimed in claim 7, further comprising sound source means controlled by the processor means according to the instruction data for generating a model performance corresponding to the exercise part of the lesson score such that the model performance is modified according to the comment to audibly teach the user.

9. The music apparatus as claimed in claim 6, wherein the processor means includes means operative when the quantitative evaluation indicates that a difference between the sample performance and the lesson score exceeds a musically acceptable degree for arranging an exercise part of the lesson score such that the exercise part is rhythmically emphasized to facilitate operation of the instrument means.

10. The music apparatus as claimed in claim 6, wherein the processor means comprises means for executing the quantitative evaluation in terms of at least one of a rhythm, a pitch and a volume of the sample performance while the qualitative evaluation is executed in terms of a total rendition of the sample performance.

11. The music apparatus as claimed in claim 6, wherein the processor means includes means for analyzing an initial performance generated by the user to determine the skill level of the user, and means for formulating the lesson score in matching with the skill level.

12. A method of using a music apparatus having a display and an instrument manually operable by a user for generating a performance and being communicable with a supervisory computer through a network for remotely training the user in matching with a skill level, the method comprising the steps of:

provisionally preparing a test piece in a user's terminal;

comparing the test piece with a performance generated by the instrument to determine differences therebetween in order to detect a training level of the user;

formulating a curriculum corresponding to the training level of the user;

displaying a lesson score on the display in matching with the skill level of the user according to the curriculum so that the user is prompted to render the displayed lesson score by operating the instrument for generating a sample performance;

comparing event data representative of the sample performance with note data representative of the lesson score to execute a quantitative evaluation of the sample performance;

transmitting the event data representative of the sample performance to the supervisory computer through the network so that the supervisory computer can work to provide a qualitative evaluation of the sample performance according to the event data to thereby arrange instruction data, the qualitative being different from the quantitative evaluation and being unavailable by the music apparatus;

receiving the instruction data from the supervisory computer through the network; and modifying the lesson score in order to improve the skill level of the user based on either of the quantitative evaluation and the qualitative evaluation represented by the received instruction data.

13. A machine readable medium for use in a music apparatus having a CPU, a display and an instrument manually operable by a user to generate a performance and being communicable with a supervisory computer through a network for remotely training the user in matching with a skill level, the medium containing a program executable by the CPU for causing the music apparatus to perform the method comprising the steps of:

provisionally preparing a test piece in a user's terminal;

comparing the test piece with a performance generated by the instrument to determine differences therebetween in order to detect a training level of the user;

formulating a curriculum corresponding to the training level of the user;

displaying a lesson score on the display in matching with the skill level of the user according to the curriculum so that the user is prompted to render the displayed lesson score by operating the instrument for generating a sample performance;

comparing event data representative of the sample performance with note data representative of the lesson score to execute a quantitative evaluation of the sample performance;

transmitting the event data representative of the sample performance to the supervisory computer through the network so that the supervisory computer can work to provide a qualitative evaluation of the sample performance according to the event data to thereby arrange instruction data, the qualitative evaluation being different from the quantitative evaluation and being unavailable by the music apparatus;

receiving the instruction data from the supervisory computer through the network; and modifying the lesson score in order to improve the skill level of the user based on either of the quantitative evaluation and the qualitative evaluation represented by the received instruction data.

* * * * *